US012389146B2

(12) United States Patent
Sun

(10) Patent No.: US 12,389,146 B2
(45) Date of Patent: Aug. 12, 2025

(54) SPEAKER ASSEMBLY, SPEAKER APPARATUS, AND MOBILE TERMINAL APPARATUS

(71) Applicant: Beijing Bytedance Network Technology Co., Ltd., Beijing (CN)

(72) Inventor: Haitao Sun, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 169 days.

(21) Appl. No.: 17/928,860

(22) PCT Filed: May 11, 2021

(86) PCT No.: PCT/CN2021/093125
§ 371 (c)(1),
(2) Date: Nov. 30, 2022

(87) PCT Pub. No.: WO2022/021998
PCT Pub. Date: Feb. 3, 2022

(65) Prior Publication Data
US 2023/0188876 A1 Jun. 15, 2023

(30) Foreign Application Priority Data
Jul. 29, 2020 (CN) ......................... 202010745044.2

(51) Int. Cl.
*H04R 1/02* (2006.01)
*H04R 1/28* (2006.01)

(52) U.S. Cl.
CPC ............. *H04R 1/026* (2013.01); *H04R 1/025* (2013.01); *H04R 1/288* (2013.01)

(58) Field of Classification Search
CPC . H04R 9/06; H04R 1/025; H04R 1/02; H04R 1/026; H04R 2400/11; H04R 31/006; H04R 1/28; H04R 1/288
(Continued)

(56) References Cited

U.S. PATENT DOCUMENTS 4,884,655 A * 12/1989 Freadman .............. H04R 1/323 181/207
4,914,750 A * 4/1990 Lawson ................. H04R 9/066 381/186
(Continued)

FOREIGN PATENT DOCUMENTS

CN 203813922 U 9/2014
CN 108282722 A 7/2018
(Continued)

OTHER PUBLICATIONS

International Search Report and Written Opinion in PCT/CN2021/093125, mailed on Aug. 10, 2021, 9 pages.
(Continued)

*Primary Examiner* — Norman Yu
(74) *Attorney, Agent, or Firm* — Astute IP Law Group

(57) ABSTRACT

A speaker assembly, a speaker apparatus and a mobile terminal apparatus are provided. In the speaker assembly, a top plate of a casing of a speaker is provided with at least one mounting base, any side wall of the shell for accommodating the speaker is provided with a convex part matching the mounting base, a fastener fixedly connects the mounting base and the convex part so that the speaker is fixed within the shell.

12 Claims, 6 Drawing Sheets

(58) Field of Classification Search
USPC ....... 381/386, 395, 332, 150, 322, 324, 361, 381/374; 181/153, 171, 148
See application file for complete search history.

(56) References Cited

U.S. PATENT DOCUMENTS

| | | | |
|---|---|---|---|
| 2006/0050919 A1 | 3/2006 | Castro et al. | |
| 2006/0215865 A1 | 9/2006 | Kang et al. | |
| 2016/0277819 A1* | 9/2016 | McBroom | H04R 9/06 |
| 2020/0196039 A1* | 6/2020 | Lee | H04R 1/2876 |

FOREIGN PATENT DOCUMENTS

| | | | |
|---|---|---|---|
| CN | 208434099 | U | 1/2019 |
| CN | 212259279 | U | 12/2020 |
| KR | 19990010322 | U | 3/1999 |
| KR | 1020080038887 | A | 5/2008 |
| WO | 2015188523 | A1 | 12/2015 |

OTHER PUBLICATIONS

Office Action for Chinese Patent Application No. 202010745044.2, mailed on Dec. 17, 2024, 15 pages.

* cited by examiner

SPEAKER ASSEMBLY, SPEAKER APPARATUS, AND MOBILE TERMINAL APPARATUS

The present application is a 35 U.S.C. § 371 National Phase of PCT Application No. PCT/CN2021/093125 filed May 11, 2021, which claims priority to Chinese patent application No. 202010745044.2, filed on Jul. 29, 2020, the disclosures of which are hereby incorporated by reference in their entireties.

TECHNICAL FIELD

The present application relates to the technical field of the speaker apparatus; specifically, the present application relates to a speaker assembly, a speaker apparatus, and a mobile terminal apparatus.

BACKGROUND

In order to improve the experience of a user of a mobile terminal apparatus, the existing mobile terminal apparatus is often provided with a speaker apparatus to improve the sound effect, but the volume of such speaker apparatus is usually relatively large; in order to reduce the volume of the mobile terminal apparatus as much as possible and to make it convenient for the user to carry, it is necessary to reduce the installation volume of the speaker apparatus as much as possible.

SUMMARY

In a first aspect, embodiments of the present application provide a speaker assembly, and the speaker assembly comprises: a speaker, the speaker comprises a casing, a top plate of the casing is provided with at least one mounting base; and a shell for accommodating the speaker, any side wall of the shell is provided with a convex part matching the mount, the mounting base and the convex part are connected with each other by a fastener so that the speaker is fixed within the shell.

Optionally, the top plate of the casing is provided with a plurality of mounting bases, and the plurality of mounting bases are alternately arranged back and forth with respect to a same straight line.

Optionally, at least one of the mounting bases is near a first side of the top plate, and at least one of the mounting bases is near a second side of the top plate.

Optionally, a total number of the mounting bases near the first side of the top plate and a total number of the mounting bases near the second side of the top plate are both an even number, and the mounting bases are arranged symmetrically with respect to a central line of a long side of the top plate.

Optionally, the mounting base is arranged near a corner of the top plate of the casing.

Optionally, the mounting base is provided with a mounting hole; the fastener is sleeved with a shock absorbing sleeve, an outer surface of the shock absorbing sleeve is provided with a ring groove matching a hole size of the mounting hole, and the ring groove is engaged with the mounting hole.

Optionally, the fastener comprises a screw, and the convex part is provided with a screw hole matching the screw.

Optionally, the shock absorbing sleeve is at least partially provided within the convex part, and a gap is provided between the convex part and the mounting base.

Optionally, each of the casing and the shell is provided with a heat dissipation hole.

In a second aspect, the embodiments of the present application provide a speaker apparatus, comprising the speaker assembly according to the first aspect.

In a third aspect, the embodiments of the present application provide mobile terminal apparatus, comprising a speaker apparatus according to the second aspect.

BRIEF DESCRIPTION OF THE DRAWINGS

The above and/or additional aspects and advantages of the present application will become apparent and easy to be understood from the following description of the embodiments in conjunction with the accompanying drawings, in which.

REFERENCE NUMERALS

Figure 1:
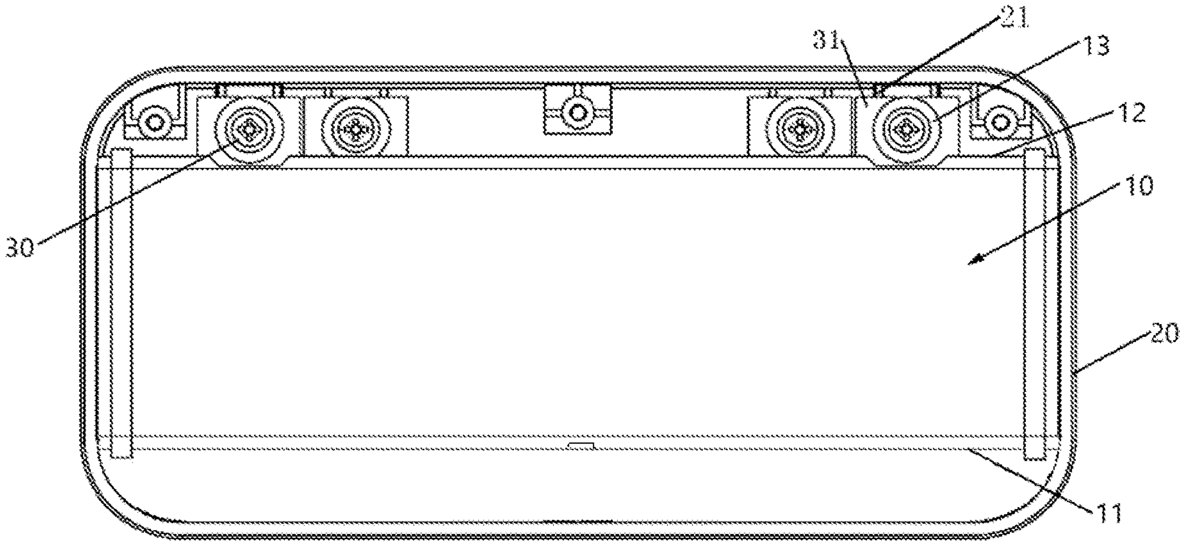
FIG. 1 is a schematically structural view of a speaker assembly provided by embodiments of the present application.

10—speaker; 11—casing; 12—top plate; 13—mounting base; 14—heat dissipation hole; 121—first side of the top plate 12; 122—second side of the top plate 12; 20—shell; 21—convex part; 22—shock absorbing layer; 23—positioning hole; 30—fastener; 31—shock absorbing sleeve; 311—groove.

DETAILED DESCRIPTION

The present application is described in detail below, examples of embodiments of the present application are shown in the drawings, and the same or similar numerals from beginning to end indicate the same or similar components or components having the same or similar functions. Further, if a detailed description of the known technique is unnecessary for the features of the present application as shown, it is omitted. The following embodiments described with reference to the drawings are exemplary and are used only to explain the present application, and cannot be construed as a limitation of the present application.

A person of ordinary skill in the art will understand that, unless otherwise defined, all terms used herein (including technical terms and scientific terms) have the same meaning as commonly understood by one of ordinary skill in the art to which the present disclosure belongs. It should also be understood that those terms, such as those defined in a general dictionary, should be understood to have a meaning consistent with the meaning in the context of the prior art, and will not be interpreted in an idealized or overly formal sense unless specifically defined as herein.

A person of ordinary skilled in the art will understand that, unless specifically stated, the singular forms used herein "a", "an" and "the" may also include plural forms. It should be further understood that the term "comprising" as used in the specification of the present application refers to the presence of the feature, integer, step, operation, component, and/or assembly, but does not exclude the presence or addition of one or more other features, integers, steps, operations, components, assemblies and/or groups thereof. It should be understood that the wording used herein "and/or" includes all or any unit and all combinations of one or more associated listed items.

Usually, under a limited installation volume, the contact area between the speaker and the shell used to install the speaker is relatively large, and when the speaker works, the vibration of the speaker often drives the vibration of the installation shell, which is easy to affect the sound effect of the speaker, thereby affecting the user's experience.

To overcome the shortcomings of the existing technique, the present application provides a speaker assembly, a speaker apparatus, and a mobile terminal apparatus, to solve the problem of the large contact area between the speaker and the shell in the art.

The beneficial technical effects of the technical solutions provided in the embodiments of the present application include:

In the speaker assembly provided in the embodiments of the present application, the top plate of the speaker casing is provided with at least one mounting base, a convex part matching the mounting base is provided on any side wall of a shell for mounting the speaker, a fastener fixedly connects the mounting base and the convex part, so that the speaker is fixed inside the shell. By fixedly connecting the speaker and the side wall of the shell, under a limited installation volume, the contact area between the speaker and the shell is reduced, and the probability of resonance between the speaker and the shell when the speaker works is reduced, thereby improving the sound effect of the speaker assembly and improving the user's experience.

Additional aspects and advantages of the present application will be partially given in the following description, which will become apparent from the following description, or learned through the practice of the present application.

The technical solution of the present application and how the technical solution of the present application solves the above technical problems will be explained in detail as follows with specific embodiments.

Embodiments of the present application provide a speaker assembly, and FIG. 1 is a schematically structural view of the speaker assembly; the speaker assembly comprises: a speaker 10, the speaker comprises a casing 11, a top plate 12 of the casing 11 is provided with at least one mounting base 13; a shell 20 for accommodating the speaker 10, any side wall of the shell 20 is provided with a convex part 21 matching the mounting base 13, a fastener 30 connects the mounting base 13 and the convex part 21, so that the speaker 10 is fixed within the shell 20.

In the speaker assembly provided in the embodiments of the present application, the top plate of the casing of the speaker is provided with at least one mounting base, the convex part matching the mounting base is provided on any side wall of the shell for mounting the speaker, the fastener fastenedly connects the mounting base and the convex part, so that the speaker is fixed inside the shell. By fixedly connecting the speaker and the side wall of the shell, under a limited installation volume, the contact area between the speaker and the shell is reduced, and the probability of resonance between the speaker and the shell when the speaker works is reduced, thereby improving the sound effect of the speaker assembly and improving the user's experience.

For example, in the speaker assembly provided in the embodiments of the present application, the convex part 21 is provided on an inner side of a top wall of the shell 20. By providing at least one mounting base 13 on the top plate 12 of the casing 11 of the speaker 10, providing the convex part 21 matching the mounting base 13 on the inner side of top wall of the shell 20 for mounting the speaker 10, and fastenedly connecting the mounting base 13 and the convex part 21 through the fastener, a fixedly connection between the speaker 10 and the top wall of the shell 20 is realized. That is, the speaker 10 and the shell 20 contact each other by the mounting base 13 and the convex part 21, which reduces the contact area between the speaker and the shell, reduces the probability of resonance between the speaker and the shell when the speaker works, and improves the sound effect of the speaker assembly, so that the user's experience is improved. It should be noted that, in the embodiments of the present application, the top plate 12 of the casing 11 refers to the side wall provided with the mounting base 13.

Those skilled in the art will appreciate that, in order to avoid vibration of the shell 20 when the speaker 10 works, contact points between the speaker 10 and the shell 20 should be reduced as much as possible during installation; in the speaker assembly provided in the embodiments of the present application, besides the connection between the mounting base 13 and the convex part 21, there is no additional contact connection point between the speaker 10 and the shell 20.

Figure 2:
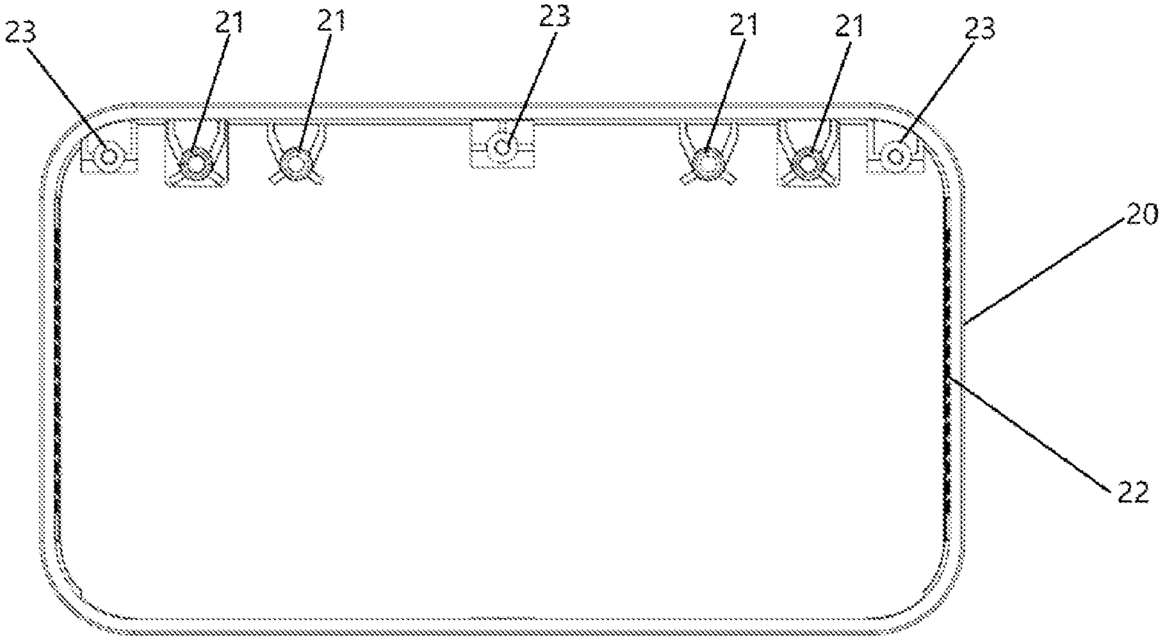
FIG. 2 is a schematically structural view of a shell in the speaker assembly as shown in FIG. 1 and provided by the embodiments of the present application.

As shown in FIG. 2, which is a schematically structural view of the shell in the speaker assembly as shown in FIG. 1 and provided by the embodiments of the present application. The inner side of the top wall of the shell 20 is provided with the convex part 21 matching the mounting base 13, the mounting base 13 is fixed to the convex part 21 by the fastener 30, so that a fixed connection of the speaker 10 to the top wall of the shell 20 is realized. In order to further avoid the speaker 10 contacting the shell 20 caused by the excessive larger vibration when the speaker 10 works, a shock absorbing layer 22 is provided between a side wall of the speaker 10 and the shell 20. The shock absorbing layer 22 includes a shock absorbing material made of at least one of polyurethane, silicone, and rubber. In the speaker assembly provided in the embodiments of the present application, the shock absorbing layer 22 is arranged on the inner side of the two opposite side walls of the shell 20.

At the same time, in order to facilitate the installation and connection of the speaker assembly with other device, in the speaker assembly provided in the embodiments of the present application, the shell 20 is further provided with at least one positioning hole 23, the positioning installation of the speaker assembly and other device is realized by the positioning hole 23.

In the embodiments of the present application, in the case where the top plate of the casing of the speaker is provided with a plurality of mounting bases 13, the plurality of mounting bases 13 are alternately arranged back and forth with respect to a same straight line. That is, the total number of mounting bases 13 is greater than 1, the mounting bases 13 are alternately arranged back and forth with respect to the same straight line. It should be noted that the straight line is parallel to the plane where the top plate 12 provided with the mounting bases 13 is located. By alternately arranging the mounting bases 13, it effectively avoids the installation difficulties due to the blocking between the mounting bases 13 when the mounting bases 13 are fastened to the convex parts 21.

Optionally, as shown in FIG. 1, in an orthographic projection direction of the speaker 10, the mounting bases 13 are arranged sequentially in a same horizontal line. In the orthographic projection direction of the speaker 10, the mounting bases 13 are arranged sequentially in the same horizontal line. By sequentially arranging the mounting bases 13 in the same horizontal line, it effectively avoids the installation difficulties due to the blocking between the mounting bases 13 when the mounting bases 13 are fastened to the convex parts 21, and thus the installation efficiency is improved. At the same time, the heights of the mounting bases 13 are guaranteed to be consistent with each other, and the stability of the installation connection between the speaker 10 and the shell 20 is realized.

Figure 3:
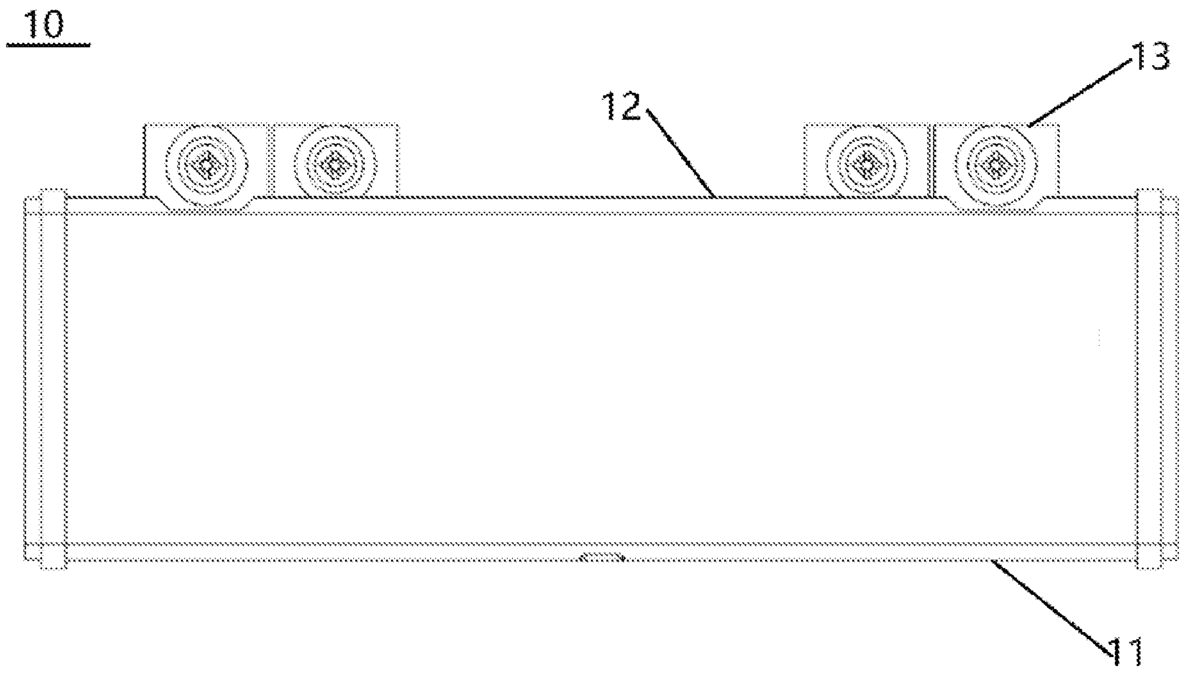
FIG. 3 is a front view of a speaker in the speaker assembly as shown in FIG. 1 and provided by the embodiments of the present application.

As shown in FIG. 3, which is the front view of the speaker in the speaker assembly provided by the embodiments of the present application. In the embodiments of the present application, the total number of mounting bases 13 for example is four; in the orthographic projection direction of the speaker 10, the four mounting bases 13 are arranged sequentially in the same horizontal line. At the same time, the four mounting bases 13 are provided in the same horizontal line, it avoids the installation difficulties due to the blocking between the mounting bases 13 when the mounting bases 13 are fastened to the convex part 21. By providing the four mounting bases 13 in the same horizontal line, the heights of the mounting bases 13 are guaranteed to be consistent with each other, and the stability of the speaker 10 installed in the shell 20 is realized.

In the embodiments of the present application, at least one mounting base 13 is near a first side of the top plate 121, and at least one mounting base 13 is near a second side of the top plate 12.

Figure 4:
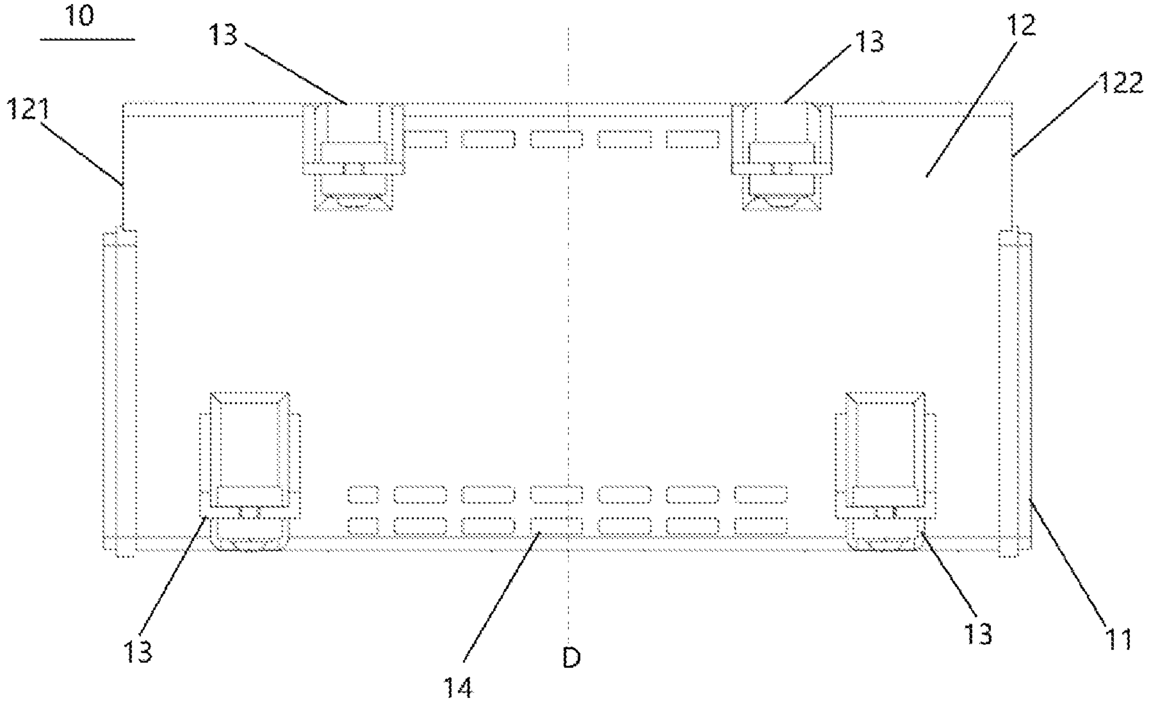
FIG. 4 is a top view of the speaker in the speaker assembly as shown in FIG. 1 and provided by the embodiments of the present application.

As shown in FIG. 4, which is a top view of the speaker in the speaker assembly provided by the embodiments of the present application. In the embodiments of the present application, at least one mounting base 13 is near the first side 121 of the top plate 12, at least one mounting base 13 is near the second side 122 of the top plate 12.

Further, the total number of the mounting bases 13 near the first side 121 of the top plate is an even number and the total number of the mounting bases 13 near the second side 122 of the top plate is an even number, and the mounting bases 13 are arranged symmetrically with respect to a central line D of a long side of the top plate 12.

In the embodiments of the present application, the total number of the mounting bases 13 is four, as shown in FIG. 4, two mounting bases 13 are provided near the first side 121 of the top plate, two mounting bases 13 are provided near the second side 122 of the top plate, and the mounting bases 13 provided on the top plate 12 are arranged symmetrically with respect to the central line D of the long side of the top plate 12.

In the embodiments of the present application, the mounting bases 13 are provided near corners of the top plate 12 of the casing 11, respectively.

It should be noted that, in order to avoid the interference of the mounting base 13 with other components mounted on the top plate 12 of the casing 11 in the speaker 10, the total number of small regions, divided by the mounting bases 13, of the top plate 12 is reduced as much as possible. In the embodiments of the present application, the four mounting bases 13 are respectively arranged as close as possible to the four corners of the top plate 12 of the casing 11. In this way, it is also possible to avoid the interference between the convex part 21 matching the mounting base 13 with other components provided on the inner side of the top wall of the shell 20. Thus, under a limited installation volume, it avoids the resonance phenomenon between the speaker and the shell when the speaker works, and the effective installation space occupied by the mounting base 13 and the convex part 21 is further reduced.

In the embodiments of the present application, the mounting base 13 is provided with a mounting hole, the fastener 30 is sleeved with a shock absorbing sleeve 31, and an outer surface of the shock absorbing sleeve 31 is provided with a ring groove 311 matching a hole size of the mounting hole, the groove 311 is engaged with the mounting hole. By providing the shock absorbing sleeve 31, the mechanical vibration between the shell 20 and the speaker 10 is buffered, the probability of resonance between the speaker 10 and the shell 20 is further reduced, thereby the sound effect of the speaker is improved, and the user's experience is improved.

Figure 5:
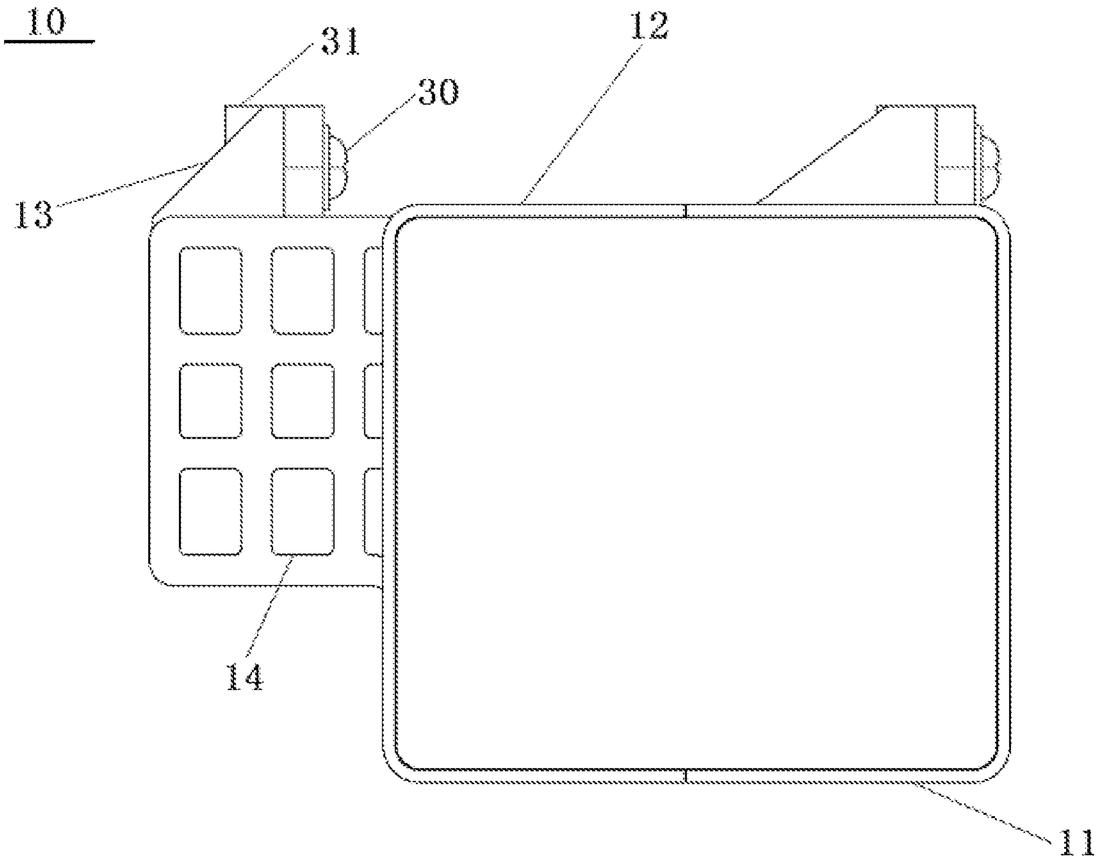
FIG. 5 is a left view of the speaker in the speaker assembly as shown in FIG. 1 and provided by the embodiments of the present application.
Figure 6:
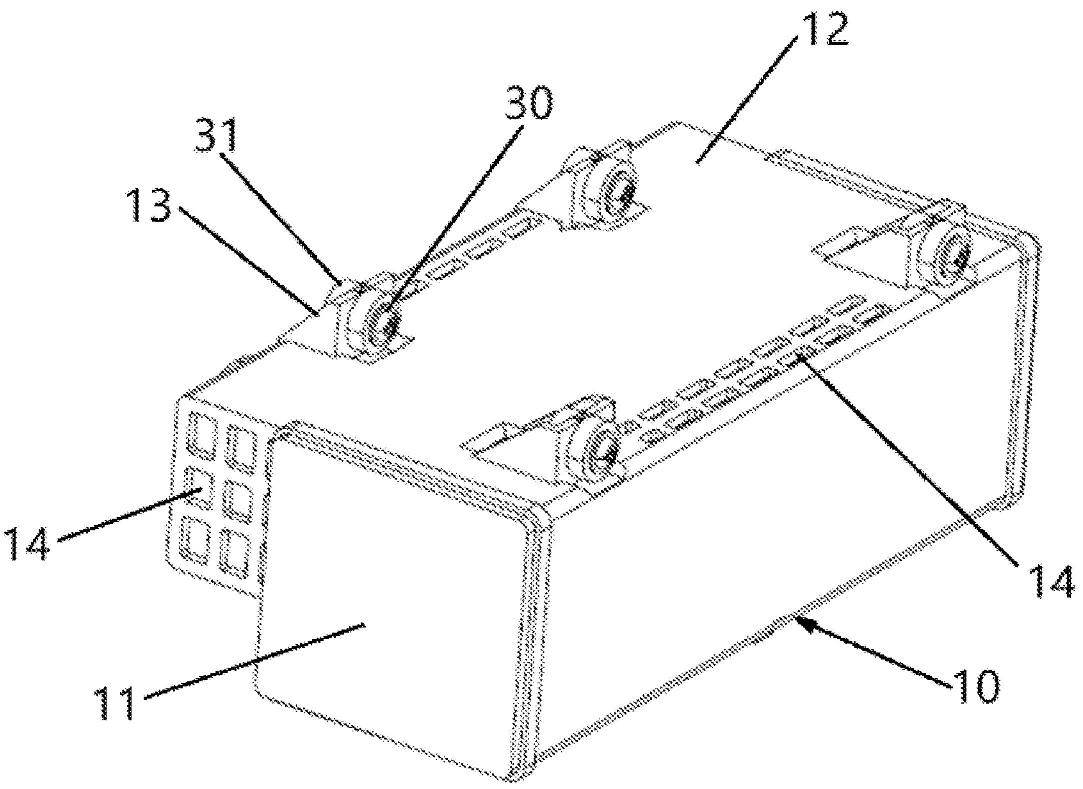
FIG. 6 is a schematically structural view of the speaker in the speaker assembly as shown in FIG. 1 and provided by the embodiments of the present application.
Figure 7:
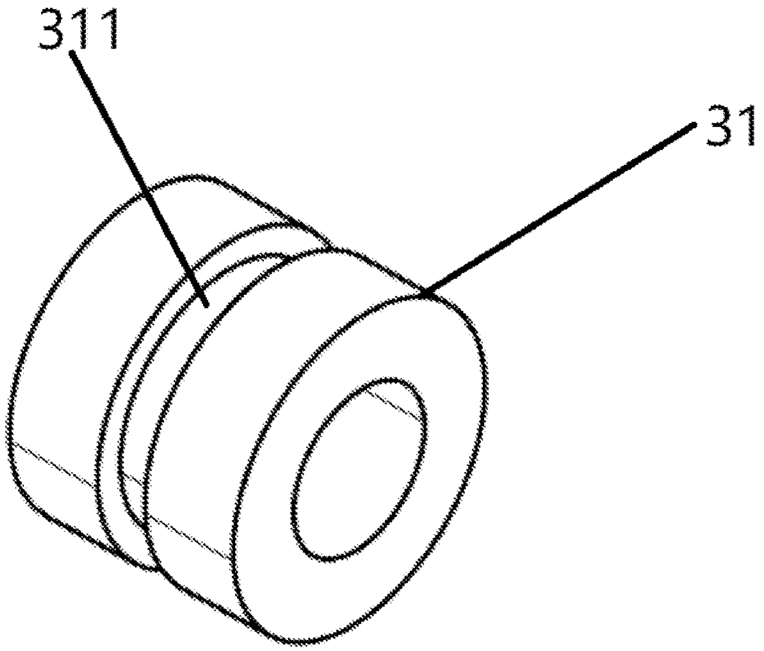
FIG. 7 is a schematically structural view of a shock absorbing sleeve in the speaker assembly provided by the embodiments of the present application.

It should be noted that FIG. 5 is a left view of the speaker in the speaker assembly provided by the embodiments of the present application, FIG. 6 is a schematically structural view of the speaker, and FIG. 7 is a schematically structural view of the shock absorbing sleeve in the speaker assembly. In the embodiments of the present application, each of the four mounting bases 13 includes a trapezoidal mounting support and a mounting hole penetrating through the trapezoidal mounting support, the mounting base 13 and the convex part 21 are fixedly connected with each other by the fastener, and a fixed connection between the speaker 10 and the top wall of the shell 20 is realized.

Further, in the embodiments of the present application, the fastener 30 includes a screw, the convex part 21 is provided with a screw hole matching the screw.

It should be further noted that, in the embodiments of the present application, the shock absorbing sleeve 31 provided on the outer surface of the fastener 30 is engaged in the mounting hole of the mounting base 13, the outer surface of the shock absorbing sleeve 31 is provided with the ring groove 311 matching the hole size of the mounting hole, the shock absorbing sleeve 31 is engaged with the mounting hole through the groove 311, and the shock absorbing sleeve 31 and the mounting base 13 are fixed together. At the same time, the screw passes through the through-hole of the shock absorbing sleeve 31, and is threadly connected with the screw hole of the convex part 21, thereby achieving a fixed connection between the speaker 10 and the top wall of the shell 20. By providing the shock absorbing sleeve 31, the direct contact between the fastener 30 and the mounting base 13 is avoided, thereby avoiding the vibration of the speaker 10 is transmitted to the shell 20 through the fastener 30, and further reducing the vibration of the shell 20 caused by the vibration of the speaker 10, thereby the sound effect of the speaker and the user's experience are improved.

In the embodiments of the present application, as shown in FIGS. 5 and 6, the shock absorbing sleeve 31 is at least partially provided within the convex part 21, and a gap is provided between the convex part 21 and the mounting base 13.

It should be noted that, in order to further avoid the vibration of the speaker 10 is transmitted to the shell 20 through the fastener 30, the shock absorbing sleeve 31 is at least partially provided within the convex part 21, in this way, the vibration energy is buffered off at least partially by the shock absorbing sleeve 31, which further reduces the vibration of the shell 20 caused by the vibration of the speaker 10. At the same time, a gap is provided between the convex part 21 and the mounting base 13, which avoids the direct contact connection between the convex part 21 and the mounting base 13. In this way, it avoids that the vibration of the speaker 10 is directly transmitted to the shell 20 through the mounting base 13, thereby further reducing the vibration of the shell 20 caused by the vibration of the speaker 10, and the sound effect of the speaker and the user's experience are improved.

In the embodiments of the present application, the shell 20 and the casing 11 are provided with a heat dissipation hole, respectively.

As shown in FIG. 4, FIG. 5, and FIG. 6, the casing 11 of the speaker 10 is provided with a plurality of rectangular heat dissipation holes 14, which slows down the speed of heat accumulation when the speaker 10 works. At the same time, the shell 20 is also provided with a plurality of heat dissipation holes (not shown in the figure). By respectively providing the heat dissipation holes on the shell 20 and casing 11, the heat accumulation when the speaker 10 works is avoided to an extent, thereby improving the working stability of the speaker assembly.

According to the concepts of the present disclosure, the embodiments of the present application provide a speaker apparatus, comprising the speaker assembly provided by any of the above embodiments.

According to the concepts of the present disclosure, the embodiments of the present application provide a mobile terminal apparatus, comprising the speaker assembly provided by the above embodiments.

By the application of the embodiments of the present application, at least following beneficial effects are achieved:

1. In the speaker assembly provided by the embodiments of the present application, the top plate of the casing of the speaker is provided with at least one mounting base, any side wall of the shell for accommodating the speaker is provided with the convex part matching the mounting base, the mounting base and the convex part are connected with each other by the fastener, so that the speaker is fixed within the shell. By the fixedly connection between the speaker and the side wall of the shell, under a limited installation volume, the contact area between the speaker and the shell is reduced, and the probability of resonance between the speaker and the shell is reduced when the speaker works, thereby improving the sound effect of the speaker assembly and improving the user's experience.
2. In the embodiments of the present application, in the orthographic projection direction of the speaker 10, the mounting bases 13 are arranged sequentially in the same horizontal line. By arranging the mounting base 13 in the same horizontal line, it effectively avoids the installation difficulties due to the blocking between the mounting bases 13 when the mounting bases 13 are fixed to the convex parts 21, and the installation efficiency is improved.
3. In the embodiments of the present application, the mounting base 13 is arranged as close as possible to the corner of the top plate 12 of the casing 11. In this way, it is also possible to avoid the interference between the convex part 21 matching the mounting base 13 and other components on the inner side of the top wall of the shell 20. Thus, under a limited installation volume, it avoids the resonance phenomenon between the speaker and the shell when the speaker works, while the effective installation space occupied by the mounting base 13 and the convex part 21 is further reduced.

Those skilled in the art will appreciate that the steps, measures, schemes in various operations, methods, processes already discussed in the present application may be alternated, changed, combined or deleted. Further, other steps, measures and schemes in various operations, methods, processes already discussed in the present application may also be alternated, changed, rearranged, disassembled, combined, or deleted. Further, the steps, measures, schemes in various operations, methods, processes in the prior art same as those disclosed in the present application may also be alternated, changed, rearranged, disassembled, combined or deleted.

In the description of the present application, it should be understood that the term "central", "up", "down", "front", "back", "left", "right", "vertical", "horizontal", "top", "bottom", "inner", "outside" and other indications of the orientation or position relationship are based on the orientation or position relationship shown in the drawings, which are only for the convenience of describing the present application and simplifying the description, not to indicate or imply that the device or component referred to must have a specific orientation, constructed and operated in a particular orientation, and therefore, cannot be understood as a limitive to this application.

The terms "first", "second" are for descriptive purposes only and cannot be understood to indicate or imply the relative importance or imply the number of technical features associated. Thus, the features defined as "first", "second" may expressly or implicitly include one or more of these features. In the description of the present application, unless otherwise indicated, the meaning of "plurality" is two or more.

In the description of the application, it should be noted that, unless otherwise expressly stated and defined, the terms "installation/mounting", "connect", "connection/connecting" should be understood in a broad sense. For example, it may be a fixed connection, a detachable connection, or an integrated connection; it may be a direct connection, or an indirect connection through an intermediate medium, or an inner communication between two components. For a person of ordinary skill in the art, the specific meaning of the above terms in the present application can be understood in accordance with specific situations.

In the description of the present specification, the specific characteristics, structures, materials, or features may be combined in a suitable manner in any one or more embodiments or examples.

The foregoing is only a part of the embodiments of the present application, it should be noted that for a person of ordinary skill in the art, without departing from the principles of the present application, various improvements and modifications may also be made, these improvements and modifications shall also be regarded as the scope of the present application.

What is claimed is:

1. A speaker assembly, comprising, a speaker, wherein the speaker comprises a casing, a top plate of the casing is provided with at least one mounting base; and a shell for accommodating the speaker, wherein any side wall of the shell is provided with a convex part matching the mounting base, the mounting base and the convex part are connected with each other by a fastener so that the speaker is fixed within the shell;

wherein the mounting base is provided with a mounting hole; and wherein the fastener is sleeved with a shock absorbing sleeve, an outer surface of the shock absorbing sleeve is provided with a ring groove matching a hole size of the mounting hole, and the ring groove is engaged with the mounting hole.

2. The speaker assembly according to claim 1, wherein the top plate of the casing is provided with a plurality of mounting bases, and the plurality of mounting bases are alternately arranged back and forth with respect to a same straight line.

3. The speaker assembly according to claim 2, wherein at least one of the mounting bases is near a first side of the top plate, and at least one of the mounting bases is near a second side of the top plate.

4. The speaker assembly according to claim 3, wherein a total number of the mounting bases near the first side of the top plate and a total number of the mounting bases near the second side of the top plate are both an even number, and the mounting bases are arranged symmetrically with respect to a central line of a long side of the top plate.

5. The speaker assembly according to claim 2, wherein in an orthographic projection direction of the speaker, the mounting bases are arranged sequentially in a same horizontal line.

6. The speaker assembly according to claim 1, wherein the mounting base is arranged near a corner of the top plate of the casing.

7. The speaker assembly according to claim 1, wherein the fastener comprises a screw, and the convex part is provided with a screw hole matching the screw.

8. The speaker assembly according to claim 1, wherein the shock absorbing sleeve is at least partially provided within the convex part, and a gap is provided between the convex part and the mounting base.

9. The speaker assembly according to claim 1, wherein each of the casing and the shell is provided with a heat dissipation hole.

10. A speaker apparatus, comprising the speaker assembly according to claim 1.

11. A mobile terminal apparatus, comprising the speaker apparatus according to claim 10.

12. The speaker assembly according to claim 1, wherein a shock absorbing layer is provided between a side wall of the speaker and the shell.

* * * * *